United States Patent
Konno et al.

(10) Patent No.: US 10,888,992 B2
(45) Date of Patent: Jan. 12, 2021

(54) ROBOT SYSTEM AND METHOD FOR CONTROLLING ROBOT SYSTEM

(71) Applicant: KABUSHIKI KAISHA YASKAWA DENKI, Kitakyushu (JP)

(72) Inventors: Tsuyoshi Konno, Kitakyushu (JP); Keigo Ishioka, Kitakyushu (JP); Hironobu Miura, Kitakyushu (JP); Tsuyoshi Ito, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 10 days.

(21) Appl. No.: 16/039,338

(22) Filed: Jul. 19, 2018

(65) Prior Publication Data

US 2019/0022851 A1 Jan. 24, 2019

(30) Foreign Application Priority Data

Jul. 20, 2017 (JP) ................................ 2017-141377

(51) Int. Cl.
*B25J 9/00* (2006.01)
*B05B 13/04* (2006.01)
*B25J 11/00* (2006.01)
*B25J 19/00* (2006.01)

(52) U.S. Cl.
CPC ........... *B25J 9/0096* (2013.01); *B25J 9/0018* (2013.01); *B25J 11/0075* (2013.01); *B25J 19/0025* (2013.01)

(58) Field of Classification Search
USPC ............................ 118/500, 321, 323; 901/43
See application file for complete search history.

(56) References Cited

U.S. PATENT DOCUMENTS

| 4,644,897 A * | 2/1987 | Fender ................ B05B 13/0242 118/323 |
| 2007/0243075 A1* | 10/2007 | Hirose ................ B05B 13/0221 417/217 |
| 2013/0259611 A1 | 10/2013 | Yoshino |
| 2015/0034698 A1 | 2/2015 | Takahashi et al. |

FOREIGN PATENT DOCUMENTS

| CN | 104339368 | 2/2015 |
| JP | H08-010948 A | 1/1996 |
| JP | 2000-176867 A | 6/2000 |
| JP | 2003-285166 A | 10/2003 |
| JP | 2013-212562 A | 10/2013 |
| JP | 2017-043477 | 3/2017 |

OTHER PUBLICATIONS

Japanese Office Action for corresponding JP Application No. 2017-141377, dated Dec. 27, 2019 (w/ machine translation).
Chinese Office Action for corresponding CN Application No. 201810573740.2, dated May 13, 2020 (w/ machine translation).
Chinese Office Action for corresponding CN Application No. 201810573740.2, dated Sep. 28, 2020.

* cited by examiner

*Primary Examiner* — Yewebdar T Tadesse
(74) *Attorney, Agent, or Firm* — Mori & Ward, LLP

(57) ABSTRACT

A robot system includes a workpiece supplier, a work robot, and a support. The workpiece supplier is to turn a workpiece about a workpiece turning axis to position the workpiece at a work position. The work robot includes a base and a robot arm. The robot arm is connected to the base turnably about an arm turning axis to perform a work on the workpiece at the work position. The arm turning axis crosses the workpiece turning axis. The support connects the workpiece supplier and the base.

18 Claims, 6 Drawing Sheets

ROBOT SYSTEM AND METHOD FOR CONTROLLING ROBOT SYSTEM

CROSS-REFERENCE TO RELATED APPLICATIONS

The present application claims priority under 35 U.S.C. § 119 to Japanese Patent Application No. 2017-141377, filed Jul. 20, 2017. The contents of this application are incorporated herein by reference in their entirety.

BACKGROUND

Field of the Invention

The embodiments disclosed herein relate to a robot system and a method for controlling a robot system.

Discussion of the Background

JP 2017-43477A discloses a machining facility that conveys a workpiece, which is a to-be-machined object, into a machining booth and that machines the workpiece in the machining booth. The machining facility includes a machining device, a turntable, and conveying means. The machining device is disposed in the machining booth. The turntable is for a workpiece to be placed on. The conveying means turns the turntable using a turnable arm to convey the workpiece from the outside of the machining booth to the inside of the machining booth.

SUMMARY

According to one aspect of the present disclosure, a robot system includes a workpiece supplier, a work robot, and a support. The workpiece supplier is to turn a workpiece about a workpiece turning axis to position the workpiece at a work position. The work robot includes a base and a robot arm. The robot arm is connected to the base turnably about an arm turning axis to perform a work on the workpiece at the work position. The arm turning axis crosses the workpiece turning axis. The support connects the workpiece supplier and the base.

According to another aspect of the present disclosure, a method for controlling a robot system, includes turning a workpiece about a workpiece turning axis to position the workpiece at a work position, by a workpiece supplier. A robot arm of a work robot is turned about an arm turning axis crossing the workpiece turning axis to perform a work on the workpiece at the work position. The robot arm is connected to a base of the work robot. The base and the workpiece supplier are connected by a support.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
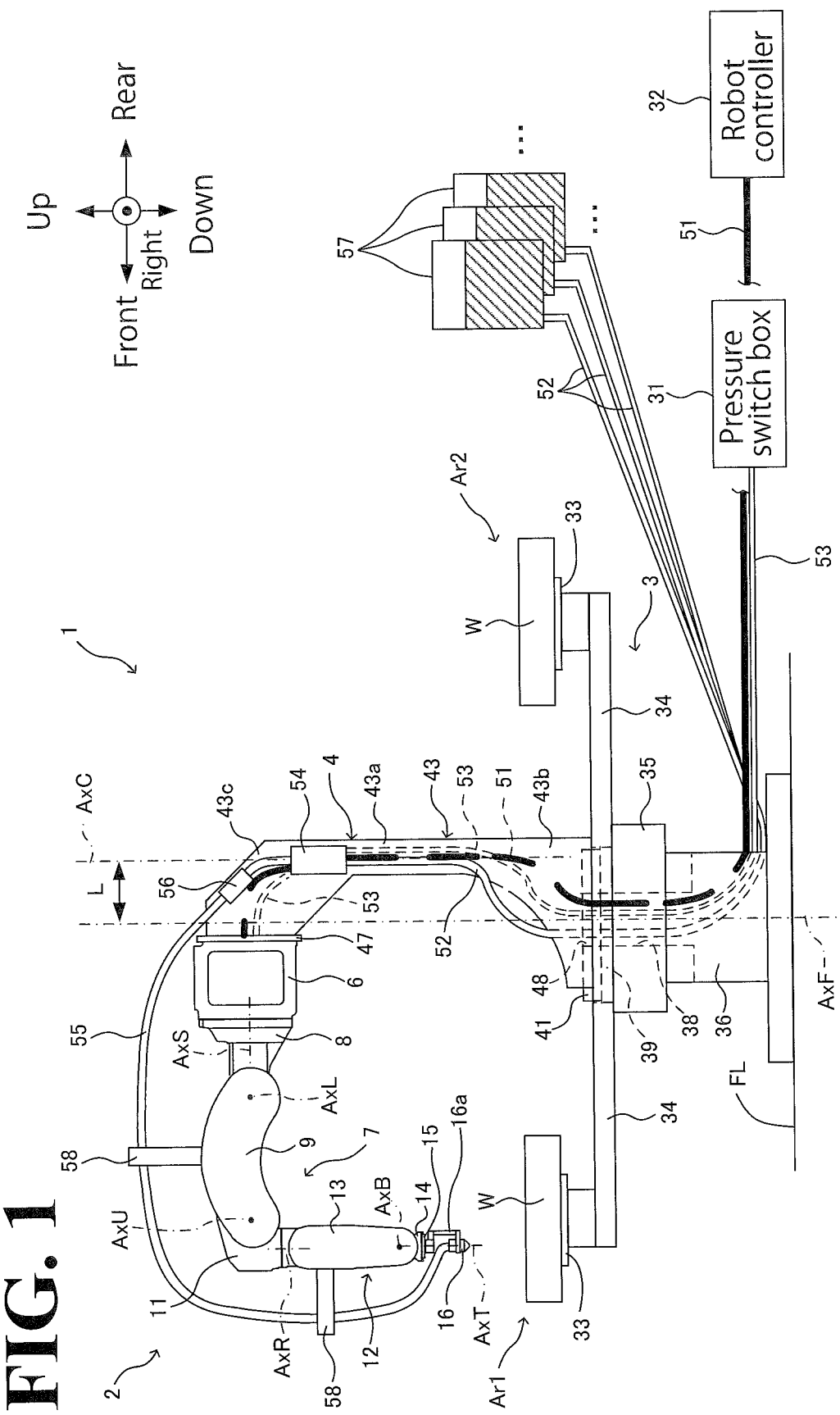
FIG. 1 illustrates an exemplary general arrangement of a robot system according to an embodiment.

The embodiments will now be described with reference to the accompanying drawings, wherein like reference numerals designate corresponding or identical elements throughout the various drawings.

For convenience of description of a robot system and its components, the following description uses "up", "down", "right", "left", "front", "rear", and other direction indicating terms. These direction indicating terms, however, are not intended as limiting the relative positions of the robot system and its components.

1. Configuration of Robot System

By referring to FIGS. 1 and 2, an exemplary configuration of a robot system 1 according to this embodiment will be described.

As illustrated in FIG. 1, the robot system 1 includes a work robot 2, a workpiece supplier 3, and a support member 4.

1-1. Configuration of Work Robot

As illustrated in FIG. 1, the work robot 2 is a coating robot that includes a robot arm 7 and a coating gun 16. The coating gun 16 is disposed at the leading end of the robot arm 7. The support member 4 is disposed on the workpiece supplier 3 and supports the work robot 2 with the robot arm 7 protruding frontward in an overturned posture.

The work robot 2 includes a base 6 and the robot arm 7. The robot arm 7 is turnable about an S axis AxS (corresponding to the first turning axis) relative to the base 6. The base 6 is disposed at an upper portion of the support member 4 with the S axis AxS directed in a direction crossing the turning axis, AxF, of the workpiece supplier 3 (in this embodiment, the direction is approximately 90° (degrees)).

The robot arm 7 has six movable portions, serving as a six-axis vertical multi-articular robot having a single arm. In this specification, the base 6 end side of each movable portion of the robot arm 7 is defined as the "base end" of the movable portion, and the end opposite to the base 6 side end is defined as the "leading end" of the movable portion. The robot arm 7 includes a turnable head 8, a first arm 9, a second arm 11, and a wrist 12. The wrist 12 has three movable portions.

The turnable head 8 is supported by the base 6 while being turnable about the S axis AxS. The turnable head 8 is driven by a motor (not illustrated) contained in the base 6 or the turnable head 8 into turning movement about the S axis AxS relative to the base 6.

The first arm 9 is supported by the leading end of the turnable head 8 while being turnable about an L axis AxL, which is a turning axis orthogonal to the S axis AxS. The first arm 9 is driven by a motor (not illustrated) disposed at or around the joint between the first arm 9 and the turnable head 8 into turning movement about the L axis AxL relative to the leading end of the turnable head 8.

The second arm 11 is supported by the leading end of the first arm 9 while being turnable about a U axis AxU, which is a turning axis parallel to the L axis AxL. The second arm 11 is driven by a motor (not illustrated) disposed at or around the joint between the second arm 11 and the first arm 9 into turning movement about the U axis AxU relative to the leading end of the first arm 9.

The wrist 12 is connected to the leading end of the second arm 11. The wrist 12 includes a first wrist movable portion 13, a second wrist movable portion 14, and a third wrist movable portion 15.

The first wrist movable portion 13 is supported by the leading end of the second arm 11 while being turnable about an R axis AxR, which is a turning axis orthogonal to the U axis AxU. The first wrist movable portion 13 is driven by a motor (not illustrated) disposed at or around the joint between the first wrist movable portion 13 and the second arm 11 into turning movement about the R axis AxR relative to the leading end of the second arm 11.

The second wrist movable portion 14 is supported by the leading end of the first wrist movable portion 13 while being turnable about a B axis AxB, which is a turning axis orthogonal to the R axis AxR. The second wrist movable portion 14 is driven by a motor (not illustrated) disposed at the first wrist movable portion 13 into turning movement about the B axis AxB relative to the leading end of the first wrist movable portion 13.

The third wrist movable portion 15 is supported by the leading end of the second wrist movable portion 14 while being turnable about a T axis AxT, which is a turning axis orthogonal to the B axis AxB. The third wrist movable portion 15 is driven by a motor (not illustrated) disposed at the first wrist movable portion 13 into turning movement about the T axis AxT relative to the leading end of the second wrist movable portion 14. At the leading end of the third wrist movable portion 15, the coating gun 16, which is an end effector, is mounted through a holder 16a.

The work robot 2 can be used in a wide variety of applications, such as coating, welding, parts assembly, and machining, by changing the kind of end effector mounted on the work robot 2. In this embodiment, since it is the coating gun 16 that is mounted at the leading end of the third wrist movable portion 15, the work robot 2 is used for coating purposes.

It will be understood by those skilled in the art that the above configuration of the work robot 2 has been described for exemplary purposes only and may be subject to many different variations. For example, the turning axis directions of the movable portions of the robot arm 7 may be other than the above-described directions. For further example, the number of the movable portions of the wrist 12 may be other than three, and/or the number of the movable portions of the robot arm 7 may be other than six.

1-2. Configuration of Workpiece Supplier

As illustrated in FIG. 1, the workpiece supplier 3 is disposed below the work robot 2. The workpiece supplier 3 turns a workpiece W, which is a coating target, about the turning axis AxF (corresponding to the second turning axis), which is perpendicular to a floor FL. In this manner, the workpiece supplier 3 supplies the workpiece W from an exchange position Ar2 to a work position Ar1, at which the work robot 2 performs work.

The workpiece supplier 3 includes a base 39, two arms 34, a turning device 35, and a support platform 36.

On the base 39, a base plate 41 of the support member 4 is disposed. On each of the two arms 34, a table 33 is disposed. The table 33 is for the workpiece W to be placed on. The two arms 34 extend horizontally outward from the base 39 and are disposed at 180-degree intervals about the turning axis AxF. The two arms 34 are turnable relative to the base 39. The turning device 35 turns the two arms 34 about the turning axis AxF. The support platform 36 is disposed under the turning device 35 and on the floor FL.

Figure 6:
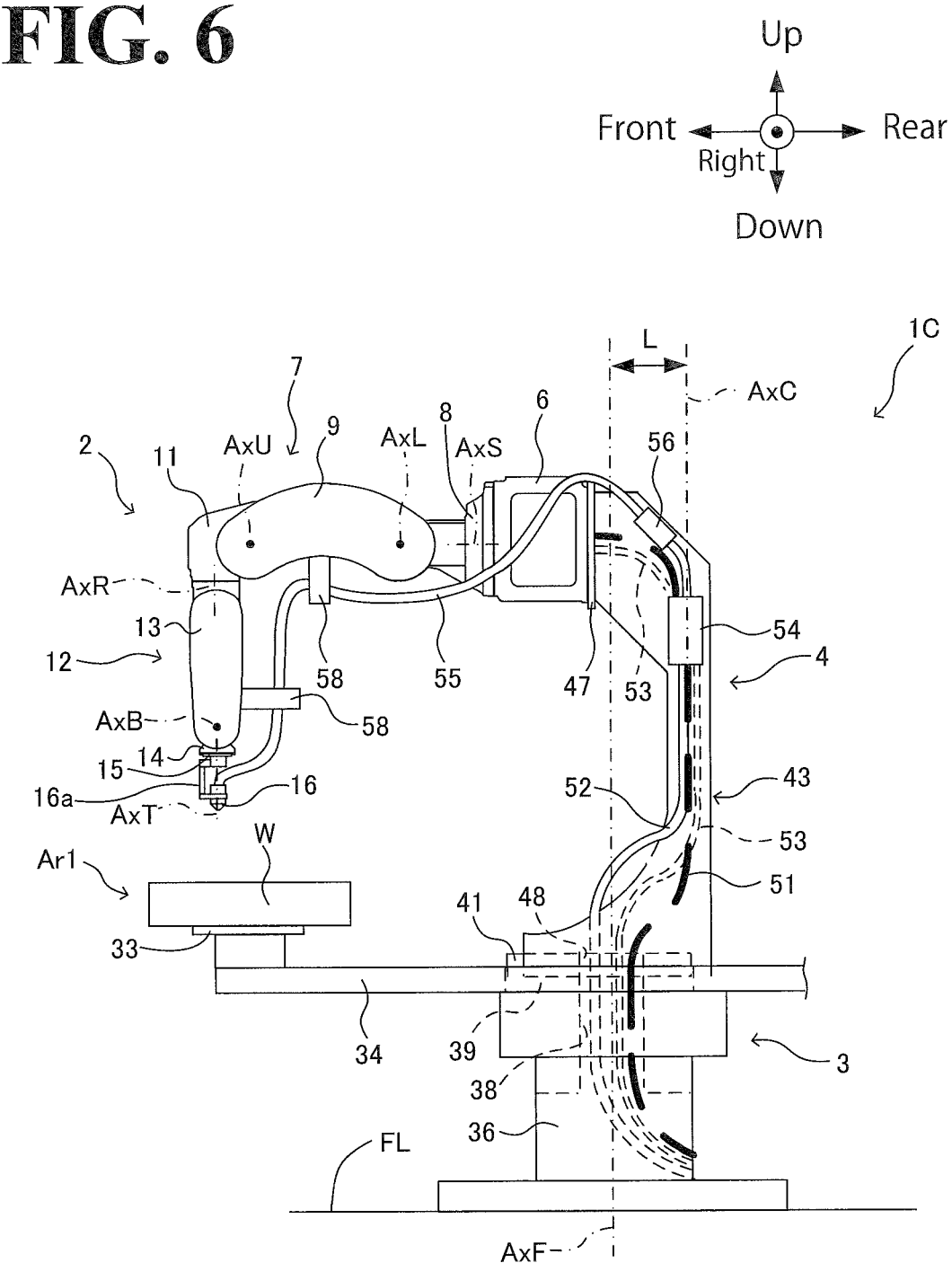
FIG. 6 illustrates an exemplary general arrangement of a robot system according to a modification in which a coating material tube is wired along the lower outer surface of a robot arm of the robot system.

The base 39, the turning device 35, and the support platform 36 have a hollow portion 38. The hollow portion 38 is for elements such as a feeding cable 51, coating material tubes 52, and an air hose 53 to pass through. The feeding cable 51 is a cable through which power is supplied to the work robot 2. The coating material tubes 52 are tubes through which coating materials of different colors are supplied to a color change valve (CCV) 54, which switches a coating material of one color to another coating material of another color. The air hose 53 is a hose through which air for scavenging the inside of the work robot 2 passes. Through the hollow portion 38, these elements are pulled above the workpiece supplier 3. The number of the coating material tubes 52 installed corresponds to the number of colors (a single coating material tube 52 alone may be provided). The end of each coating material tube 52 opposite to the CCV 54 is connected to a coating material tank 57 corresponding to the color of each coating material tube 52 (the coating material tank 57 includes a pump, not illustrated). The air hose 53 is made up of a going hose and a returning hose (one of which alone is illustrated in FIGS. 1 and 6 for simplicity reasons). The end of the air hose 53 opposite to the work robot 2 is connected to a pressure switch box 31. The end of the feeding cable 51 opposite to the work robot 2 is connected to a robot controller 32.

The workpiece supplier 3 turns the two arms 34 about the turning axis AxF to convey the workpiece W between the work position Ar1 and the exchange position Ar2. The work position Ar1 is on the inside of a coating booth (explosion-proof region). The exchange position Ar2 is on the outside (non-explosion-proof region) of the coating booth. At the work position Ar1, the workpiece W is coated by the work robot 2. At the exchange position Ar2, the coated workpiece W is replaced with a new, un-coated workpiece W.

It will be understood by those skilled in the art that the above configuration of the workpiece supplier 3 has been described for exemplary purposes only and may be subject to many different variations. For example, the number of the arms 34 will not be limited to two (180-degree intervals), other examples including one (360-degree intervals), three (120-degree intervals), four (90-degree intervals), and more than four.

1-3. Configuration of Support Member

As illustrated in FIG. 1, the support member 4 stands on an upper portion of the workpiece supplier 3, connecting the work robot 2 and the workpiece supplier 3 to each other. As illustrated in FIG. 2, the support member 4 includes the base plate 41, two columns 42, two side plates 43, a holding member 44, and a connection board 47.

The base plate 41 has a through hole 48. The through hole 48 penetrates the base plate 41 in the upward or downward direction. The base plate 41 is disposed on the base 39 of the workpiece supplier 3, and the through hole 48 communicates with the hollow portion 38 of some elements of the workpiece supplier 3, including the base 39 and the turning device 35. The feeding cable 51, the coating material tube 52, and the air hose 53 passing through the hollow portion 38 are pulled above the base plate 41 through the through hole 48.

The two columns 42 are rectangular column members standing at rear portions of the upper surface of the base plate 41 with a predetermined gap between the two columns 42 in the rightward or leftward direction. As illustrated in FIG. 1, the center axis, AxC, of the two columns 42 is displaced from the turning axis AxF, which is the center of turning of the workpiece supplier 3, by a predetermined distance L in a direction (in this embodiment, rearward) perpendicular to the turning axis AxF. This makes the work robot 2 displaced further rearward than when the columns 42 stand along the turning axis AxF. This, in turn, optimizes the installment position of the work robot 2, with the movable range of the work robot 2 approximately matching the workpiece W supplied to the work position Ar1.

Figure 2:
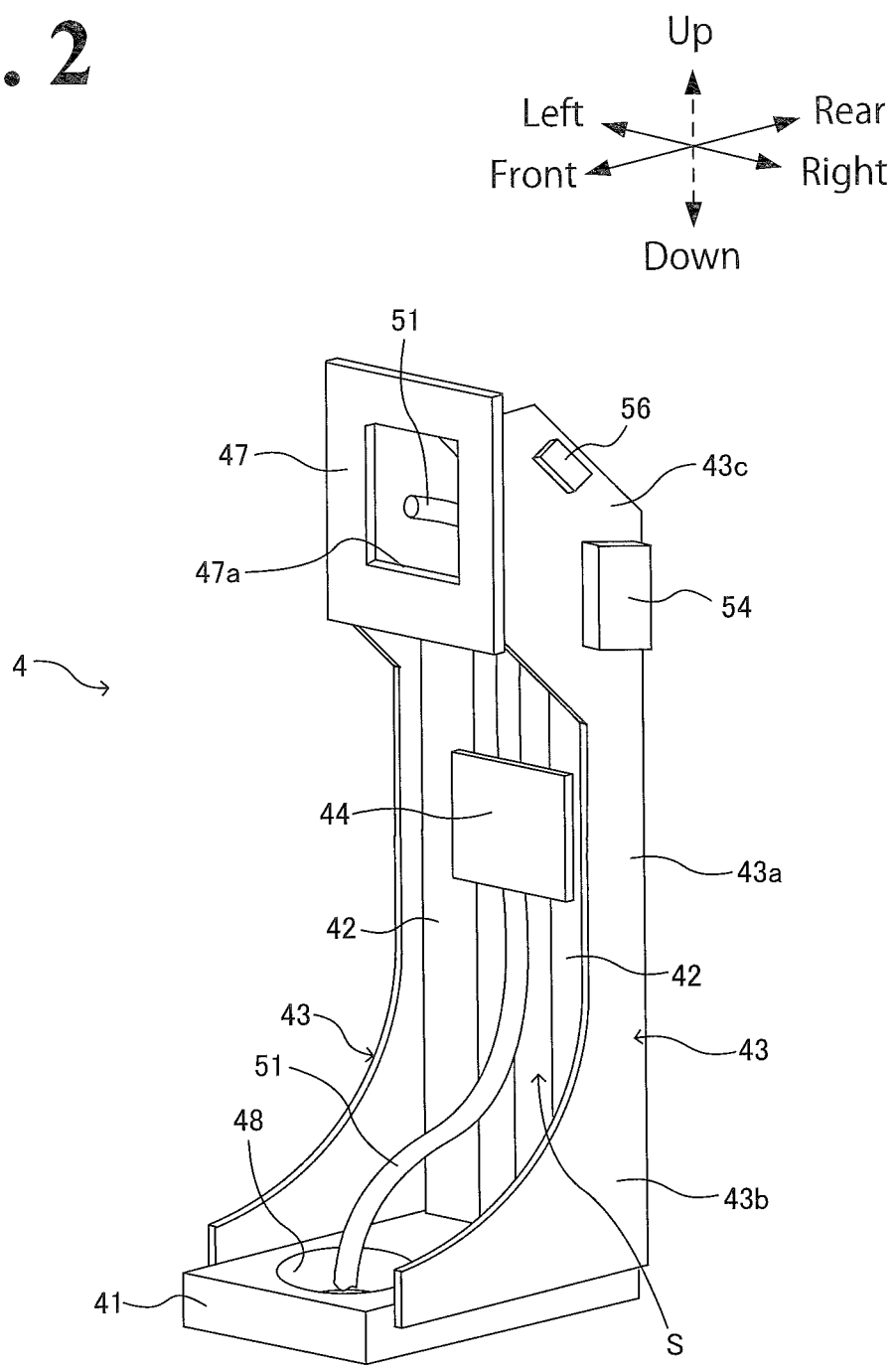
FIG. 2 is a perspective view of an exemplary configuration of a support member supporting a work robot of the robot system.

As illustrated in FIG. 2, one of the two side plates 43 is mounted on the right side surface of the base plate 41 and on the right side surface of one of the two columns 42, and the other side plate 43 is mounted on the left side surface of the base plate 41 and on the left side surface of the other column 42. Each side plate 43 includes an intermediate portion 43a, a connection portion 43b, and an instrument-equipped portion 43c. The connection portion 43b is disposed at a lower portion of the intermediate portion 43a. The instrument-equipped portion 43c is disposed at an upper portion of the intermediate portion 43a. The connection portion 43b has an arcuate shape with its frontward-rearward width increasing in the downward direction. Each connection portion 43b connects one side surface of one column 42 and one side surface of the base plate 41 to each other. The instrument-equipped portion 43c has a frontward-rearward width increasing in the upward direction, and is equipped with instruments driven when the work robot 2 performs coating work. Examples of the instruments driven when the work robot 2 performs coating work include the CCV 54 and an air-operated valve (AOPR) 56. The CCV 54 switches a coating material of one color to another coating material of another color. The AOPR 56 adjusts the injection pressure of the coating materials. In this embodiment, the CCV 54 and the AOPR 56 are disposed on the instrument-equipped portion 43c of the right side plate 43. It is noted that elements such as the coating material tube 52 and the air hose 53 are not illustrated in FIG. 2.

The holding member 44 is a rectangular plate member mounted on the front surfaces of the two columns 42 at approximately half the height of the two columns 42. The holding member 44 includes a clamp disposed on the rear surface of the holding member 44. Using the clamp, the holding member 44 holds (clamps) the feeding cable 51, the air hose 53, and other elements.

The connection board 47 is a rectangular plate member connecting the instrument-equipped portions 43c of the two side plates 43 to each other. As illustrated in FIG. 1, the connection board 47 is where the base 6 of the work robot 2 is mounted. The connection board 47 has an opening 47a for the feeding cable 51, the air hose 53, and other elements to pass through so that the feeding cable 51, the air hose 53, and other elements are introduced into the work robot 2 from the support member 4.

In the support member 4 with the above-described configuration, the feeding cable 51 is wired as follows. As illustrated in FIG. 2, the feeding cable 51 pulled up above the base plate 41 is bent in the rearward direction between the connection portions 43b of the two side plates 43, and then introduced into the gap, S, between the columns 42. In the gap S, the feeding cable 51 is wired in the upward direction and held by the holding member 44. The feeding cable 51 is further wired in the upward direction in the gap S, and then bent in the frontward direction between the instrument-equipped portions 43c of the two side plates 43. Then, the feeding cable 51 is passed through the opening 47a of the connection board 47 and introduced into the base 6 of the work robot 2. Then, the feeding cable 51 is connected to the motors in the joints of the robot arm 7 through connectors, not illustrated. The air hose 53, not illustrated in FIG. 2, is wired in a manner similar to the manner in which the feeding cable 51 is wired.

The coating material tube 52 is wired as follows. As illustrated in FIG. 1, the coating material tube 52 pulled above the base plate 41 is bent in the rearward direction between the connection portions 43b of the two side plates 43 and guided onto the outer surface of the right side plate 43. Along the outer surface of the right side plate 43, the coating material tube 52 is wired in the upward direction and brought into connection with the CCV 54, which is disposed on the outer surface of the instrument-equipped portion 43c. At the valve-inlet side of the CCV 54, the CCV 54 is connected with a single coating material tube 52 or a plurality of coating material tubes 52, depending on the number of colors. At the valve-outlet side of the CCV 54, the CCV 54 is connected with a single coating material tube 55. The coating material tube 55 is brought into connection with the AOPR 56, and then wired over the upper outer surface of the robot arm 7. Finally, the coating material tube 55 is brought into connection with the coating gun 16. The coating material tube 55 is supported by a plurality of brackets 58. The brackets 58 include a bracket 58 disposed on the outer surface of (the upper side of) the first arm 9 of the robot arm 7, and a bracket 58 disposed on the outer surface (the front side of) of the first wrist movable portion 13 of the wrist 12.

It will be understood by those skilled in the art that the above configuration of the support member 4 has been described for exemplary purposes only and may be subject to many different variations. For example, a holding member to hold the coating material tube 52 may be provided on a side plate 43. For further example, the CCV 54 and the AOPR 56 may be disposed on different side plates 43, the right side plate 43 or the left side plate 43. For still further example, the coating material tube 52 may be wired through the gap S between the columns 42, similarly to the feeding cable 51. In this case, the CCV 54 and the AOPR 56 may be disposed inside the instrument-equipped portion 43c. For still further example, the instruments disposed in the instrument-equipped portion 43c of a side plate 43 may be other than the CCV 54 and the AOPR 56. A non-limiting example is a flushable gear pump (FGP).

It will be understood by those skilled in the art that the CCV 54, the AOPR 56, and the coating gun 16 are respectively connected with control-air tubes (not illustrated) so that the CCV 54, the AOPR 56, and the coating gun 16 are controlled by ON/OFF control of air pressure, which is not referred to in the above description. These tubes may be wired in a manner similar to the manner in which the feeding cable 51 or the coating material tube 52 is wired.

The CCV 54 and the AOPR 56 may not necessarily be disposed in or on the support member 4. Instead, CCV 54 and the AOPR 56 may be disposed at some other place in the coating booth (explosion-proof region). A non-limiting example is an inner wall surface of the coating booth.

The support member 4 may not necessarily be an integral member. Instead, the support member 4 may be made up of a plurality of members. For example, the support member 4 may be divided in the upward or downward direction into instrument-equipped portions 43c, intermediate portions 43a, and connection portions 43b.

2. Movable Range of Work Robot in Robot System

By referring to FIGS. 3 to 5, description will be made with regard to exemplary movable ranges of work robots in robot systems according to comparative examples and an exemplary movable range of the work robot in the robot system according to this embodiment.

2-1. When Work Robot is Large-Size

Figure 3:
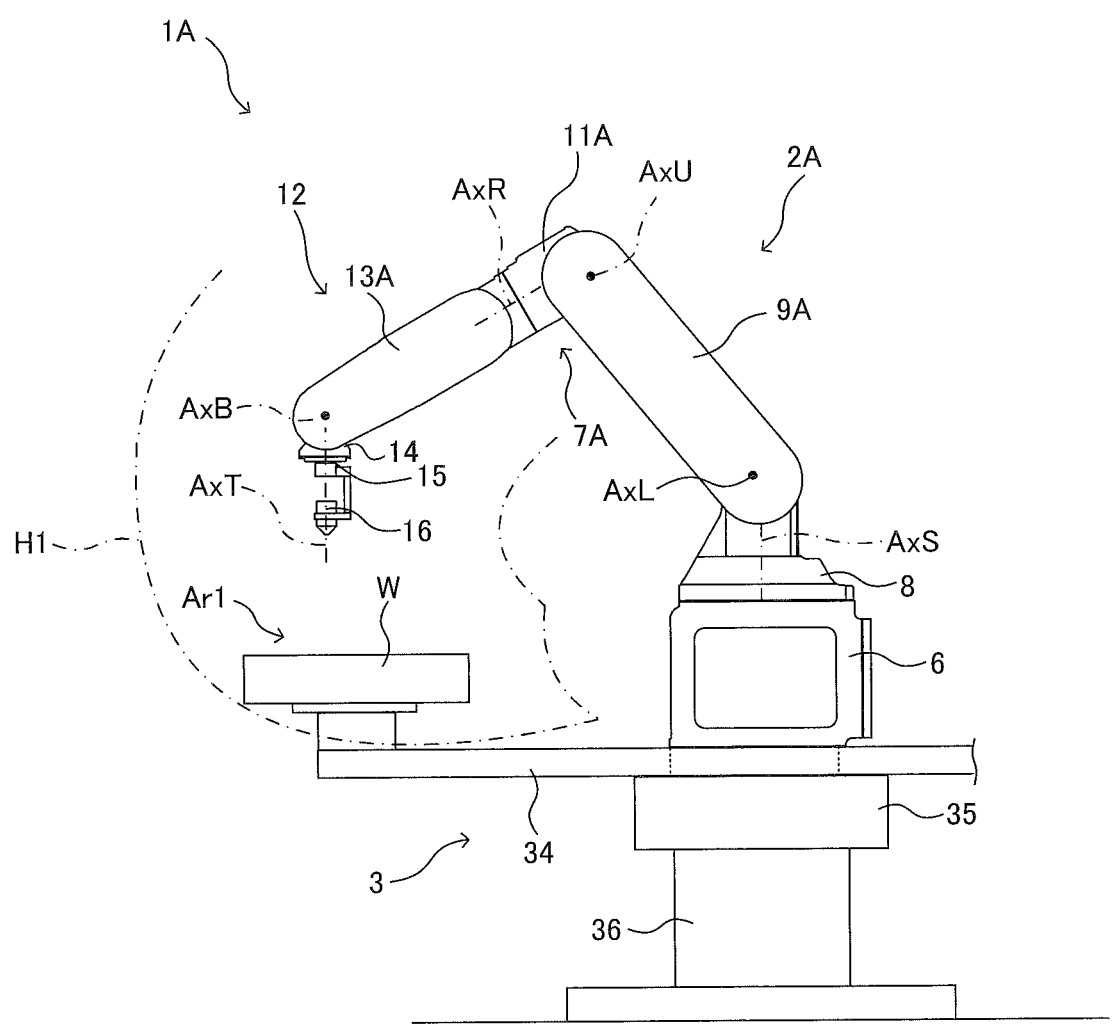
FIG. 3 illustrates an exemplary movable range of a work robot of a robot system according to a first comparative example.

FIG. 3 illustrates an exemplary movable range of a work robot 2A in a robot system 1A according to a first comparative example.

As illustrated in FIG. 3, in the robot system 1A, the work robot 2A is disposed on the workpiece supplier 3 without intervention by a support member. The work robot 2A is larger in size than the work robot 2 according to the above embodiment. A robot arm 7A of the work robot 2A includes a first arm 9A, a second arm 11A, and a first wrist movable portion 13A. The first arm 9A, the second arm 11A, and the first wrist movable portion 13A are respectively longer in reach than the first arm 9, the second arm 11, and the first wrist movable portion 13 of the work robot 2 according to the above embodiment. The work robot 2A is otherwise similar in configuration to the work robot 2 and will not be elaborated upon further here.

In the first comparative example, the total length of the robot arm 7A is large enough that the work robot 2A has a comparatively wide movable range H1, covering approximately the entire range of the workpiece W supplied to the work position Ar1. This enables the work robot 2A to perform coating work properly over approximately the entire range of the workpiece W. However, in the first comparative example, the largeness of the work robot 2A may cause an increase in size of the robot system 1A, resulting in enlargement of the space where the robot system 1A is installed.

2-2. When Small-Size Work Robot is Installed without Intervention by Support Member FIG. 4 illustrates an exemplary movable range of a work robot 2 in a robot system 1B according to a second comparative example.

Figure 4:
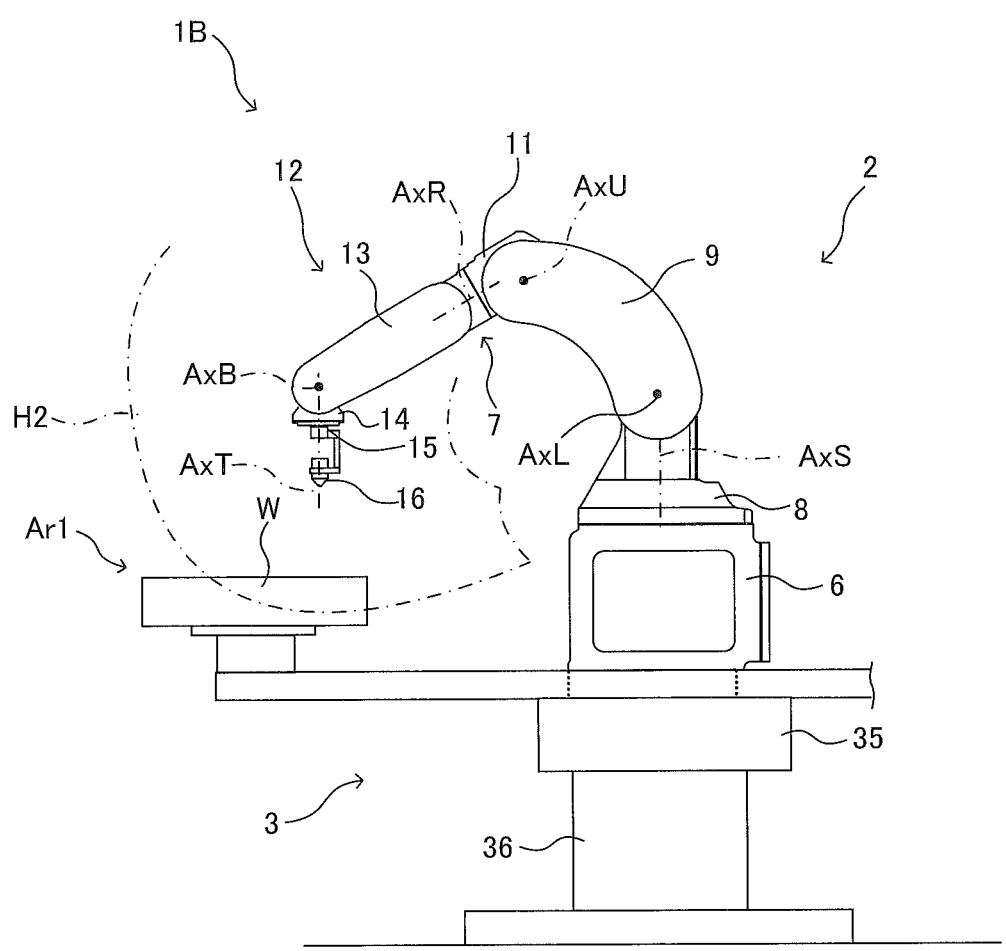
FIG. 4 illustrates an exemplary movable range of a work robot of a robot system according to a second comparative example.

As illustrated in FIG. 4, in the robot system 1B, the work robot 2 is disposed on the workpiece supplier 3 without intervention by a support member. The work robot 2 is identical to the work robot 2 according to the above embodiment and is smaller in size than the work robot 2A according to the first comparative example. Specifically, the robot arm 7 of the work robot 2 includes the first arm 9, the second arm 11, and the first wrist movable portion 13, which are respectively shorter in reach than the first arm 9A, the second arm 11A, and the first wrist movable portion 13A of the work robot 2A according to the first comparative example. The work robot 2 is otherwise similar in configuration to the work robot 2 according to the above embodiment and will not be elaborated further upon here.

In the second comparative example, the smallness of the work robot 2, as compared with the first comparative example, makes the robot system 1B smaller in size, enabling the robot system 1B to space in save. However, since the total length of the robot arm 7 is too short, the work robot 2 has a movable range H2 too small to cover the entire range of the workpiece W supplied to the work position Ar1. Thus, there is a possibility that the work robot 2 is not able to perform coating work properly over the entire range of the workpiece W.

2-3. When Small-Size Work Robot is Installed with Support Member

Figure 5:
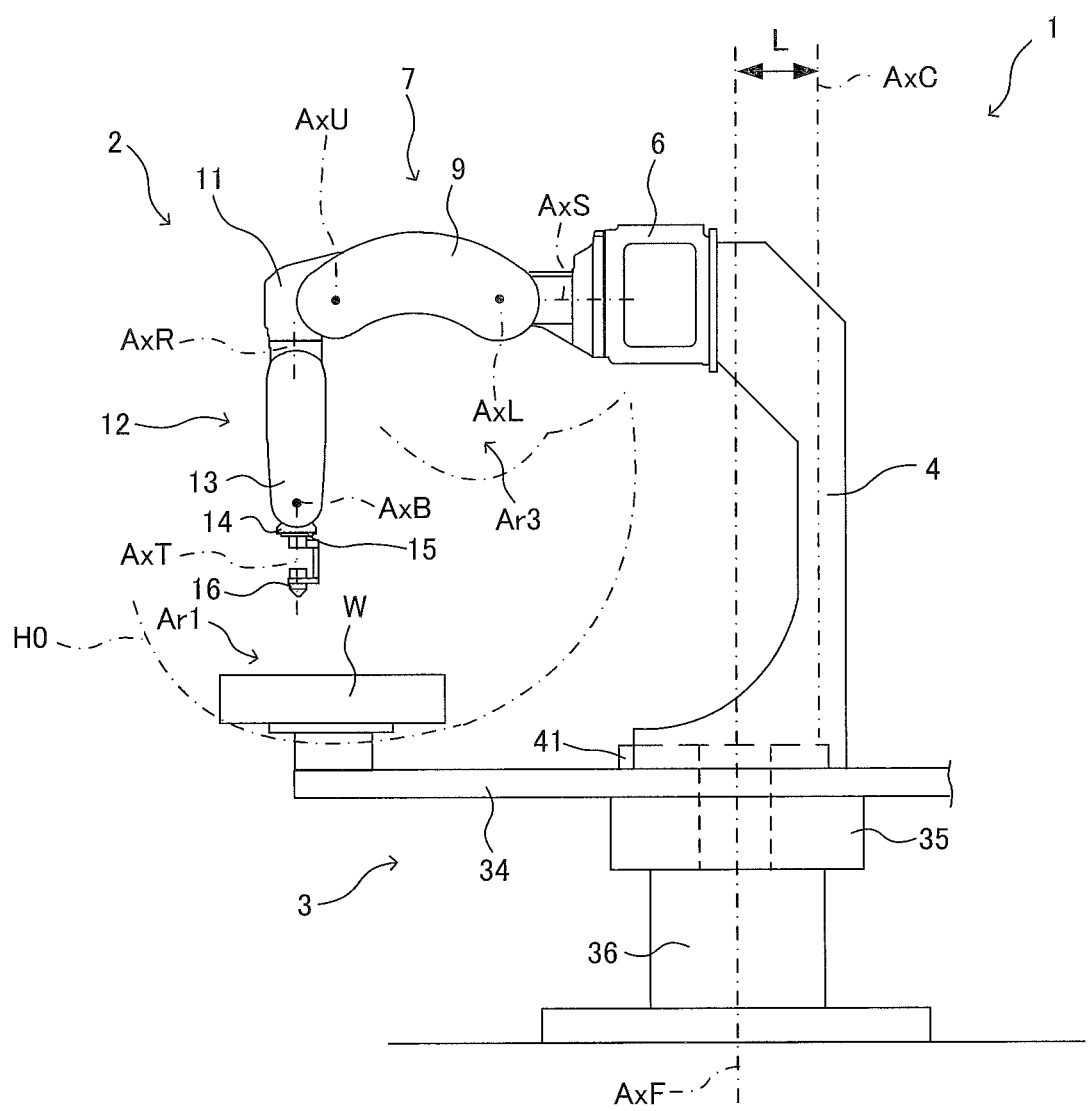
FIG. 5 illustrates an exemplary movable range of the work robot of the robot system according to the embodiment.

FIG. 5 illustrates an exemplary movable range of the work robot 2 in the robot system 1 according to the above embodiment.

As illustrated in FIG. 5, in the robot system 1, the work robot 2 is disposed on the workpiece supplier 3 through the support member 4. The support member 4 supports the work robot 2 at a predetermined height with the S axis AxS of the work robot 2 crossing the turning axis AxF of the workpiece supplier 3 at approximately 90°. The support member 4 (the center axis AxC of the columns 42) stands at a position displaced from the turning axis AxF by the predetermined distance L in a direction perpendicular to the turning axis AxF. This configuration optimizes the position of the work robot 2 in the height direction (upward or downward direction) and the position of the work robot 2 in the horizontal direction (frontward or rearward direction). Specifically, the movable range, H0, of the work robot 2 covers approximately the entire range of the workpiece W supplied to the work position Ar1. The above configuration also ensures that an inoperable region Ar3, in which the work robot 2 is inoperable (a region near a breast portion of the robot arm 7), is located upward further away from the workpiece W.

Thus, in this embodiment, the smallness of the work robot 2 makes the robot system 1 smaller in size, enabling the robot system 1 to space in save. Also, this embodiment optimizes the installment position and posture of the work robot 2, ensuring that the movable range H0 approximately matches the workpiece W and the work robot 2 performs coating work properly over approximately the entire range of the workpiece W.

3. Advantageous Effects of the Embodiment

As has been described hereinbefore, the robot system 1 according to this embodiment includes the work robot 2, the workpiece supplier 3, and the support member 4. The work robot 2 includes the base 6 and the robot arm 7, which is turnable about the S axis AxS relative to the base 6 to perform coating work on the workpiece W. The workpiece supplier 3 is disposed below the work robot 2 and causes the workpiece W to turn about the turning axis AxF so as to supply the workpiece W to the work position Ar1, at which the work robot 2 performs the coating work. The support member 4 connects the work robot 2 and the workpiece supplier 3 to each other and supports the work robot 2 with the S axis AxS crossing the turning axis AxF. This configuration provides advantageous effects some of which are described below.

The robot system 1, in which the work robot 2 is disposed on the workpiece supplier 3, conveys the workpiece W from the exchange position Ar2 (for example, outside of the coating booth) to the work position Ad (for example, inside of the coating booth). For this purpose, each of the arms 34 (turnable arms) of the workpiece supplier 3 has a predetermined length corresponding to the conveyance distance over which the workpiece W is conveyed. At the same time, there is a need for space saving in such robot systems. One possible approach is to make the work robot 2, which is disposed on the workpiece supplier 3, smaller in size. This approach, however, may make the movable range H2 of the work robot 2 small as compared with the length of the arms 34, as in the second comparative example (FIG. 4). As a result, the work robot 2 may not be able to perform work properly on the workpiece W.

In this embodiment, the support member 4 stands on the workpiece supplier 3 and supports the work robot 2 with the S axis AxS of the work robot 2 crossing the turning axis AxF of the workpiece supplier 3. This optimizes the installment position and posture of the work robot 2, ensuring that the movable range H0 of the work robot 2 approximately matches the workpiece W supplied to the work position Ar1, even if the work robot 2 is downsized. This enables the work robot 2 to perform work properly on the workpiece W and makes the robot system 1 downsizable.

Also in this embodiment, the work robot 2, the workpiece supplier 3, and the support member 4 are integrated to each other. This reduces process step counts associated with design, production, and other related activities necessary for obtaining the support member 4 for the work robot 2, and reduces process step counts associated with installment work (such as positioning work), as compared with the case where the work robot 2 and the workpiece supplier 3 are separate from each other. This results in an advantageous reduction in cost.

Also in this embodiment, the support member 4 (the center axis AxC of the columns 42) stands at a position displaced from the turning axis AxF by the predetermined distance L in a direction perpendicular to the turning axis AxF.

This optimizes the position of the work robot 2 in the horizontal direction (direction perpendicular to the turning axis AxF), ensuring that the movable range H0 of the work robot 2 approximately matches the workpiece W supplied to the work position Ar1.

Also in this embodiment, the robot system 1 includes the holding member 44. The holding member 44 is disposed in the support member 4 and holds the feeding cable 51 of the robot arm 7.

This ensures that the feeding cable 51 is held by the support member 4 at its intermediate portion, eliminating or minimizing wobbling and vibration of the feeding cable 51 and eliminating or minimizing wear and other damage of the feeding cable 51 caused by friction and/or collision.

Also in this embodiment, the workpiece supplier 3 includes at least one arm 34, the turning device 35, and the hollow portion 38. The at least one arm 34 includes the table 33, which is for the workpiece W to be placed on. The turning device 35 turns the at least one arm 34 about the turning axis AxF. The hollow portion 38 is disposed at a center portion of the turning device 35, and elements such as the feeding cable 51 and the coating material tube 52 are passed through the hollow portion 38.

This eliminates or minimizes interference between the at least one arm 34 and elements such as the feeding cable 51 and the coating material tube 52. Also, elements such as the feeding cable 51 and the coating material tube 52 wired along the support member 4 can be pulled downward through the hollow portion 38 of the workpiece supplier 3. This simplifies the layout of cables and tubes.

Also in this embodiment, the robot system 1 includes instruments (the CCV 54 and the AOPR 56) that are disposed in or on the support member 4 and that are drivable when the work robot 2 performs coating work. This configuration provides advantageous effects some of which are described below.

Specifically, some of the instruments driven when the work robot 2 performs coating work are preferably disposed at or near the robot arm 7. However, if the work robot 2 is downsized, there are greater restrictions on weight transportable by the robot arm 7, making it difficult or impossible to mount these instruments at or near the robot arm 7.

In this embodiment, the above instruments are disposed on the support member 4. This ensures that even if the work robot 2 is downsized, the above instruments are disposed near the robot arm 7, regardless of the weight of the instruments.

Also, the CCV 54 is disposed on the support member 4. This makes the CCV 54 closer to the coating gun 16 than when the CCV 54 is disposed on, for example, the workpiece supplier 3 or the floor FL. This reduces the amount of discharge of coating material and the amount of thinner involved in changing coating material colors, resulting in reduction in running cost and reduction in environmental load. Also, the AOPR 56 is disposed on the support member 4. This improves the accuracy with which the amount of ejection of coating material is controlled.

Also in this embodiment, the support member 4 supports the work robot 2 with approximately 90° angle between the S axis AxS and the turning axis AxF. This configuration provides advantageous effects some of which are described below.

Generally, work robots have wider movable ranges in the space in front of the work robots. In this embodiment, the work robot 2 has such a posture that the angle between the S axis AxS and the turning axis AxF is approximately 90°. This ensures that the workpiece W is disposed at a position in the space in front of the work robot 2. This more readily makes the movable range H0 of the work robot 2 approximately match the workpiece W supplied to the work position Ar1.

Also in this embodiment, the work robot 2 is a coating robot to perform coating work on the workpiece W.

This enables the work robot 2 to perform coating work properly on the workpiece W and realizes a downsized coating robot system.

4. Modifications

Modifications of the above-described embodiment will be described below.

4-1. Coating Material Tube Wired Along Lower Outer Surface of Robot Arm

In the above-described embodiment, the coating material tube 55 is wired over the upper outer surface of the robot arm 7 and brought into connection with the coating gun 16. Alternatively, the coating material tube 55 may be wired along the lower outer surface of the robot arm 7 and brought into connection with the coating gun 16. FIG. 6 illustrates an exemplary general arrangement of a robot system 1C according to this modification.

As illustrated in FIG. 6, in the robot system 1C, after the coating material tube 55 is brought into connection with the AOPR 56, the coating material tube 55 is wired along the lower outer surface of the robot arm 7 and brought into connection with the coating gun 16. The coating material tube 55 is supported by a plurality of brackets 58. The brackets 58 include a bracket 58 disposed on the inner surface of (the lower side of) the first arm 9 of the robot arm 7, and a bracket 58 disposed on the inner surface (the rear side of) of the first wrist movable portion 13 of the wrist 12. The robot system 1C is otherwise similar in configuration to the robot system 1 according to the above embodiment and will not be elaborated upon further here.

In this modification, the total length of the coating material tube 55 can be shortened, as compared with the above embodiment. This further reduces the amount of discharge of coating material and the amount of thinner involved in changing coating material colors at the CCV 54, resulting in reduction in running cost and reduction in environmental load.

4-2. Other Notes

In the above embodiment, coating work is exemplified as the predetermined work performed by the work robot 2. In another possible embodiment, the work robot 2 may perform welding, parts assembly, cutting, machining, or any other work than coating.

Also, the posture of the work robot 2 supported by the support member 4 will not be limited to the posture with approximately 90° angle between the S axis AxS and the turning axis AxF. In another possible embodiment, the work robot 2 supported by the support member 4 may have such a posture that the angle between the S axis AxS and the turning axis AxF is 70°, 80°, or any other angle than 90°.

As used herein, the terms "perpendicular", "parallel", and "plane" may not necessarily mean "perpendicular", "parallel", and "plane", respectively, in a strict sense. Specifically, the terms "perpendicular", "parallel", and "plane" mean "approximately perpendicular", "approximately parallel", and "approximately plane", respectively, with design-related and production-related tolerance and error taken into consideration.

Also, when the terms "identical", "same", "equivalent", and "different" are used in the context of dimensions, magnitudes, sizes, or positions, these terms may not necessarily mean "identical", "same", "equivalent", and "different", respectively, in a strict sense. Specifically, the terms "identical", "same", "equivalent", and "different" mean "approximately identical", "approximately same", "approximately equivalent", and "approximately different", respectively, with design-related and production-related tolerance and error taken into consideration.

Otherwise, the above-described embodiment and modifications may be combined in any manner deemed suitable.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A robot system comprising:
    a workpiece supplier to revolve a workpiece about a workpiece turning axis to transfer the workpiece from an exchange position to a work position;
    a work robot comprising:
        a base; and
        a robot arm to perform a work on the workpiece at the work position, the robot arm comprising:
            a turnable head provided at an end of the robot arm and connected to the base turnably about an arm turning axis, the arm turning axis crossing the workpiece turning axis; and
    a support connecting the workpiece supplier and the base, wherein the support stands at a position separated by a first distance from the workpiece turning axis in a direction substantially perpendicular to the workpiece turning axis.

2. The robot system according to claim 1, further comprising:
    a holder disposed at the support to hold a feeding cable of the robot arm.

3. The robot system according to claim 2, wherein the workpiece supplier comprises:
    a supplier arm comprising a table on which the workpiece is to be placed; and
    a turning device configured to turn the supplier arm about the workpiece turning axis, the turning device including a hollow which is disposed at a center of the turning device and through which the feeding cable is to be passed.

4. The robot system according to claim 3, further comprising:
    an instrument that is disposed at the support and that is drivable when the work robot performs the work.

5. The robot system according to claim 3, wherein the support supports the base such that an angle between the arm turning axis and the workpiece turning axis is approximately 90 degrees.

6. The robot system according to claim 2, further comprising:
    an instrument that is disposed at the support and that is drivable when the work robot performs the work.

7. The robot system according to claim 2, wherein the support supports the base such that an angle between the arm turning axis and the workpiece turning axis is approximately 90 degrees.

8. The robot system according to claim 1, further comprising:
    an instrument that is disposed at the support and that is drivable when the work robot performs the work.

9. The robot system according to claim 1, wherein the support supports the base such that an angle between the arm turning axis and the workpiece turning axis is approximately 90 degrees.

10. The robot system according to claim 1, wherein the work robot comprises:
    a coating robot configured to perform a coating work on the workpiece.

11. The robot system according to claim 1, further comprising:
    a holder disposed at the support to hold a feeding cable of the robot arm.

12. The robot system according to claim 11, wherein the workpiece supplier comprises:
    a supplier arm comprising a table on which the workpiece is to be placed;
    a turning device configured to turn the supplier arm about the workpiece turning axis, the turning device including a hollow which is disposed at a center of the turning device and through which the feeding cable is to be passed.

13. The robot system according to claim 12, further comprising:
    an instrument that is disposed at the support and that is drivable when the work robot performs the work.

14. The robot system according to claim 11, further comprising:
    an instrument that is disposed at the support and that is drivable when the work robot performs the work.

15. The robot system according to claim 1, further comprising:
    an instrument that is disposed at the support and that is drivable when the work robot performs the work.

16. The robot system according to claim 1, wherein the support supports the base such that an angle between the arm turning axis and the workpiece turning axis is approximately 90 degrees.

17. The robot system according to claim 1, wherein the base is separated from the workpiece supplier in a direction along the workpiece turning axis to separate an inoperable region of the robot arm from the workpiece.

18. The robot system according to claim 1, wherein the base of the work robot is provided above the workpiece supplier in a height direction of the robot system.

\* \* \* \* \*